(12) United States Patent
Martin et al.

(10) Patent No.: US 7,954,991 B2
(45) Date of Patent: Jun. 7, 2011

(54) SCREW EXTRUDER WITH PLUNGER FEEDER

(75) Inventors: Charles Martin, Somerville, NJ (US); Elliott Gilbert, Highlands, NJ (US)

(73) Assignee: Leistritz Extrusionstechnik GmbH (DE)

( * ) Notice: Subject to any disclaimer, the term of this patent is extended or adjusted under 35 U.S.C. 154(b) by 879 days.

(21) Appl. No.: 11/983,596

(22) Filed: Nov. 9, 2007

(65) Prior Publication Data

US 2009/0123587 A1 May 14, 2009

(51) Int. Cl.
*B29B 7/42* (2006.01)
*B29B 7/46* (2006.01)

(52) U.S. Cl. .......................... 366/76.7; 366/84
(58) Field of Classification Search .............. 366/76.7, 366/76.8, 84, 85; 425/204, 208
See application file for complete search history.

(56) References Cited

U.S. PATENT DOCUMENTS

| | | | |
|---|---|---|---|
| 3,245,116 A * | 4/1966 | Hendry | 425/166 |
| 3,263,278 A | 8/1966 | Hendry | |
| 3,789,103 A * | 1/1974 | Sueyoshi et al. | 264/328.2 |
| 4,512,730 A | 4/1985 | Kudert et al. | |
| 4,909,724 A * | 3/1990 | Sonoda et al. | 425/544 |
| 5,281,384 A | 1/1994 | Banks | |
| 5,454,995 A | 10/1995 | Rusconi et al. | |
| 5,863,567 A | 1/1999 | Klaus | |
| 6,086,353 A | 7/2000 | Klaus | |
| 6,168,417 B1 | 1/2001 | Takahashi | |
| 6,623,153 B2 * | 9/2003 | Lieb | 366/76.7 |
| 7,168,944 B2 | 1/2007 | Schad | |
| 7,229,205 B2 | 6/2007 | Schunk et al. | |

FOREIGN PATENT DOCUMENTS

| | | |
|---|---|---|
| EP | 1260346 A | 11/2002 |
| GB | 1457103 A | 12/1976 |
| JP | 08 118422 A | 5/1996 |
| JP | 2000 190378 A | 7/2000 |

OTHER PUBLICATIONS

International Preliminary Report on Patentability With Written Opinion of the International Searching Authority (Jul. 20, 2009).

* cited by examiner

*Primary Examiner* — David L Sorkin
(74) *Attorney, Agent, or Firm* — Florek & Endres PLLC

(57) ABSTRACT

The present invention is directed to a materials extrusion device including a screw extruder with a plunger feeder. It includes a screw extruder having a main housing, a materials advancing screw, a screw drive mechanism, a feed port for inputting materials to be extruded and an extrusion outlet port. It also includes a plunger feeder having an elongated, upwardly biased (non-horizontal) plunger housing, e.g., a cylinder, with a plunger. A plunger drive mechanism is connected to the plunger to move the plunger upwardly and downwardly within the plunger housing, and there is a feed outlet at an upper end of the plunger housing, the feed outlet being connected to the screw extruder feed port.

20 Claims, 5 Drawing Sheets

SCREW EXTRUDER WITH PLUNGER FEEDER

BACKGROUND OF INVENTION a. Field of Invention

The invention relates generally to single screw extruders and multi-screw extruders, especially twin screw extruders that utilize gravity-filled plunger feeders to precisely control rate of feed to the extruders. In some preferred embodiments, the present invention devices are for batch preparation of small-scale products, such as pharma products, and extremely accurate feed rates and product densities are achieved using present invention device micro-plungers.

b. Description of Related Art

The following patents are representative of various types of extruders:

U.S. Pat. No. 7,229,205 B2 to Schunk et al. describes a drive unit for operating a plastics injection machine including a rotatably supported bushing intended for accommodation of an extruder screw and a rotor which includes a hollow shaft and is defined by an inner diameter sized to allow passage of the bushing and accommodated extruder screw through the rotor. The rotor is hereby detachably connected with the receiving member in fixed rotative engagement.

U.S. Pat. No. 7,168,944 B2 to Schad describes an energy efficient drive system provided for use on typical injection molding machines whereby a single electric motor drives both the extruder screw and a hydraulic motor that continuously charges a hydraulic accumulator during the extrusion process. During the injection cycle, the charge in the accumulator is directed to stroke the extruder screw and inject melt into the mold cavities. Another embodiment utilizes a similar arrangement on the clamp mechanism of the injection molding machine whereby the charge in the accumulator is directed to hold the mold closed during the injection cycle.

U.S. Pat. No. 6,481,043 B2 to Anderson et al. describes a rotary brush attachment tool for a hand-held vacuum cleaner having a dust bowl terminating in a nozzle end providing a mechanical force that acts to move foreign matter into the attachment tool from which the foreign matter is drawn into the nozzle end of the dust bowl of the hand-held vacuum cleaner to which it is removably attached.

U.S. Pat. No. 6,168,417 B1 to Takahashi describes a vertical molding machine vertically provided with a pre-plastication injection unit where an injection unit and a plastication unit are mounted side by side. The tips of these units are linked by a connecting pipe to transfer resin plasticated by the plastication unit to the injection unit therethrough. The injection unit and the plastication unit are individually supported by respective pairs of supports standing upright above a clamping device. The injection unit has an arm member on either side thereof and a spring member is provided on the top of the arm member. The plastication unit is held on the arm member through the spring member, where the supports for the plastication unit are inserted through the arm member and the spring member.

U.S. Pat. No. 6,086,353 to Klaus describes a two-stage, all-electric injection unit. More specifically, an injection unit in which the feed screw is preferably used only for plastication and the injection of the plasticized material is accomplished by a separate accumulator having an electrically driven linear actuator, such as a ball screw mechanism. The plunger of the accumulator is configured with a helical flight and is rotatable by way of a one-way clutch interposed between the plunger and the ball screw.

U.S. Pat. No. 5,863,567 to Klaus describes a two-stage, all-electric injection unit. More specifically, an injection unit in which the feed screw is preferably used only for plastication and the injection of the plasticized material is accomplished by a separate accumulator having an electrically driven linear actuator, such as a ball screw mechanism. The accumulator is configured so that the ratio of the piston stroke to the piston diameter is preferably in the range of ten to fifteen. In the preferred embodiment there are separate motors for rotation of the screw and operation of the accumulator. An alternate embodiment is disclosed wherein the system is driven with a single motor and one-way clutches.

U.S. Pat. No. 5,454,995 to Rusconi et al. describes a method of the present invention related to reducing cycle time in injection molding machines that are running large capacity molds, such as multiple cavity perform molds, and require a high volume supply of quality melt. Specifically, the present invention proposes using a continually plasticising extruder to supply two melt accumulators that will alternately operate to inject the plastic material into the mold. To accomplish this, a rotary valve at the end of the extruder is controlled to fill the pots, and ball check valves are positioned to control flow direction and limit pressure in certain parts of the system. A shuttle valve between the shot pots and before the nozzle facilitates decompression.

U.S. Pat. No. 5,281,384 to Banks describes an improved method for injection molding including the steps of plasticizing a shot of molding material with the extruder running at a high rpm, transferring the shot to an accumulator means with the extruder running at a low rpm, and injecting the shot into a mold cavity.

U.S. Pat. No. 4,512,730 to Kudert et al. describes a device for use with a runner block and a multipolymer co-injection nozzle having separate rear entrance ports for separate polymer streams, in a multicoinjection nozzle, multi-polymer injection molding machine, for receiving from the runner block a plurality of separate polymer flow streams and for redirecting them to flow axially out of the forward end of the device into the nozzle rear entrance ports. The device has inlets cut radially into its periphery, each for receiving a polymer flow stream, and has feed channels, each in communication with an inlet and having an inward portion cut toward the device's central axis, and an axial portion communicating with the inward portion, running axially forward and terminating at an exit hole in the device's forward end, the exit holes being in a spaced pattern for feeding the separate polymer flow streams in spaced relation into the nozzle rear entrance ports. In preferred embodiments, the inlets communicate with feed throats, each cut radially into and running about a portion of the circumference of the device and having a terminal end portion which communicates with an axial feed channel, and receiving chamber, desirably of stepped configuration, is cut axially into the forward end and adapted to receive a co-injection nozzle. Most of the exit holes are radially spaced from each other by an arc of 60°. Isolation means, preferably including a plurality of annular grooves are cut into the periphery of the device between inlets and have an expandable piston ring seated therein to maintain the polymer flow streams isolated from one another.

Notwithstanding the prior art, the present invention is neither taught nor rendered obvious thereby.

SUMMARY OF INVENTION

The present invention is directed to a materials extrusion device including a screw extruder with a plunger feeder. It includes a screw extruder having a main housing, a materials advancing screw, a screw drive mechanism, a feed port for inputting materials to be extruded and an extrusion outlet port. It also includes a plunger feeder having an elongated, upwardly biased plunger housing, a plunger positioned in the plunger housing, a plunger drive mechanism connected to the plunger to move the plunger upwardly and downwardly within the plunger housing, and a feed outlet at an upper end of the plunger housing, the feed outlet being connected to the screw extruder feed port. A user may position the plunger downwardly in the plunger housing, gravity fill the housing with materials to be extruded, operate the screw extruder with the screw drive mechanism and operate the plunger drive mechanism to advance the plunger upwardly for moving the materials at a controlled rate out of the plunger housing and into the screw extruder for extrusion of the materials therefrom.

In some preferred embodiments of the present invention materials extrusion device including a screw extruder with a plunger feeder, the plunger drive mechanism includes a power screw and a gear motor with a timing belt and variable rate control means.

In some preferred embodiments of the present invention materials extrusion device including a screw extruder with a plunger feeder, the screw extruder further includes at least one heating element and heating element control means. The device may utilize heating during the extrusion process or cold extrude without heat.

In some preferred embodiments of the present invention materials extrusion device including a screw extruder with a plunger feeder, the screw extruder is a horizontal screw extruder and the plunger feeder is a non-horizontal plunger feeder. In some most preferred embodiments, the screw extruder is a horizontal screw extruder and the plunger feeder is a vertical plunger feeder.

In some preferred embodiments of the present invention materials extrusion device including a screw extruder with a plunger feeder, the plunger drive mechanism includes a power screw, a DC gear motor with a timing belt and a DC motor controller. Alternatively, non-electric drive mechanisms could be used without exceeding the scope of the present invention, such as pneumatic, hydraulic, mechanical or other drive mechanisms.

In some preferred embodiments of the present invention materials extrusion device including a screw extruder with a plunger feeder, the plunger drive mechanism includes a power screw and an AC gear motor with a timing belt and an AC motor controller.

In some preferred embodiments of the present invention materials extrusion device including a screw extruder with a plunger feeder, the device includes a plunger feeder bypass to enable operation of the plunger feeder while bypassing the screw extruder to test or calibrate the plunger feeder.

In some preferred embodiments of the present invention materials extrusion device including a screw extruder with a plunger feeder, the plunger feeder is a micro plunger feeder and the plunger feeder includes stops that limit travel of the plunger to less than ten inches.

In some preferred embodiments of the present invention materials extrusion device including a screw extruder with a plunger feeder, the device contains components that contact materials to be extruded that are made of an acceptable non-reactive material selected from the group consisting of stainless steel, nickel-based alloy, inert plastic and combinations thereof.

In some different preferred embodiments of the present invention materials extrusion device, it includes a multi-screw extruder with a plunger feeder. The multi-screw extruder has a main housing, materials advancing multi-screws, a twin-screw drive mechanism, a feed port for inputting materials to be extruded and an extrusion outlet port. The plunger feeder has an elongated, upwardly biased plunger housing, a plunger positioned in the plunger housing, a plunger drive mechanism connected to the plunger to move the plunger upwardly and downwardly within the plunger housing, and a feed outlet at an upper end of the plunger housing, the feed outlet being connected to the multi-screw extruder feed port. A user may position the plunger downwardly in the plunger housing, gravity fill the housing with materials to be extruded, operate the multi-screw extruder with the screw drive mechanism and operate the plunger drive mechanism to advance the plunger upwardly for moving the materials at a controlled rate out of the plunger housing and into the multi-screw extruder for extrusion of the materials therefrom.

In some preferred embodiments of the present invention materials extrusion device including a multi-screw extruder with a plunger feeder, the plunger drive mechanism includes a power screw and a gear motor with a timing belt and variable rate control means.

In some preferred embodiments of the present invention materials extrusion device including a multi-screw extruder with a plunger feeder, the multi-screw extruder further includes at least one heating element and heating element control means. The device may utilize heating during the extrusion process or cold extrude without heat.

In some preferred embodiments of the present invention materials extrusion device including a multi-screw extruder with a plunger feeder, the multi-screw extruder is a horizontal multi-screw extruder and the plunger feeder is a non-horizontal plunger feeder.

In some preferred embodiments of the present invention materials extrusion device including a multi-screw extruder with a plunger feeder, the multi-screw extruder is a horizontal multi-screw extruder and the plunger feeder is a vertical plunger feeder.

In some preferred embodiments of the present invention materials extrusion device including a multi-screw extruder with a plunger feeder, the plunger drive mechanism includes a power screw, a DC gear motor with a timing belt and a DC motor controller. As mentioned above, in the alternative, non-electric drive mechanisms could be used without exceeding the scope of the present invention, such as pneumatic, hydraulic, mechanical or other drive mechanisms.

In some preferred embodiments of the present invention materials extrusion device including a multi-screw extruder with a plunger feeder, the plunger drive mechanism includes a power screw and an AC gear motor with a timing belt and an AC motor controller.

In some preferred embodiments of the present invention materials extrusion device including a multi-screw extruder with a plunger feeder, the device includes a plunger feeder bypass to enable operation of the plunger feeder while bypassing the multi-screw extruder to test or calibrate the plunger feeder.

In some preferred embodiments of the present invention materials extrusion device including a multi-screw extruder with a plunger feeder, the plunger feeder is a micro plunger feeder and the plunger feeder includes stops that limit travel of the plunger to less than ten inches.

In some preferred embodiments of the present invention materials extrusion device including a multi-screw extruder with a plunger feeder, the device contains components that contact materials to be extruded that are made of an acceptable non-reactive material selected from the group consisting of stainless steel, nickel-based alloy, inert plastic and combinations thereof.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings.

DETAILED DESCRIPTION OF THE EMBODIMENTS

Figure 1:
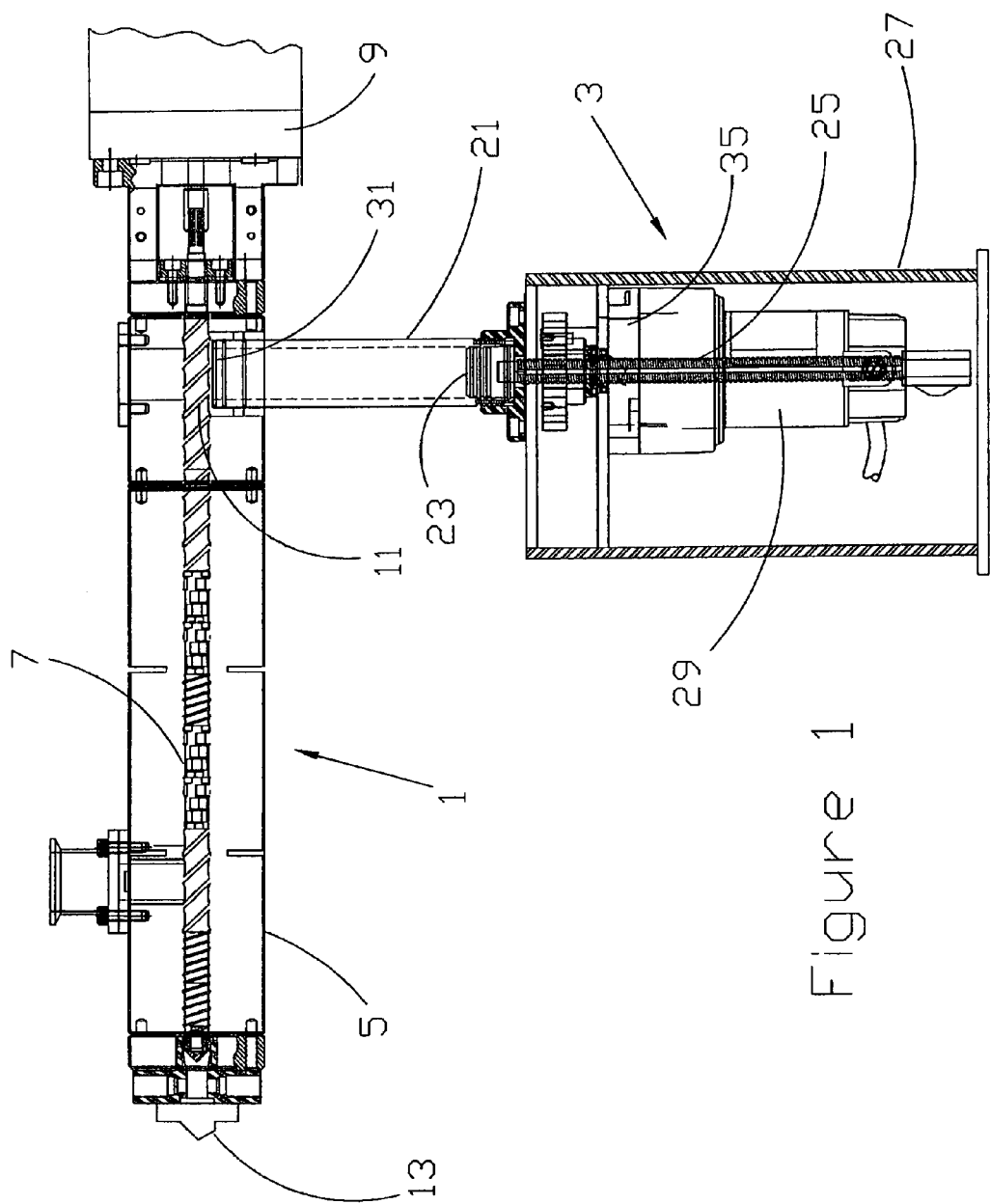
FIG. 1 is a side view of an embodiment of a present invention materials extrusion device including a multi-screw extruder with a plunger feeder.

Referring now in detail to the drawings wherein like reference numerals designate corresponding parts throughout the several views, various embodiments of the present invention are shown.

Figure 2:
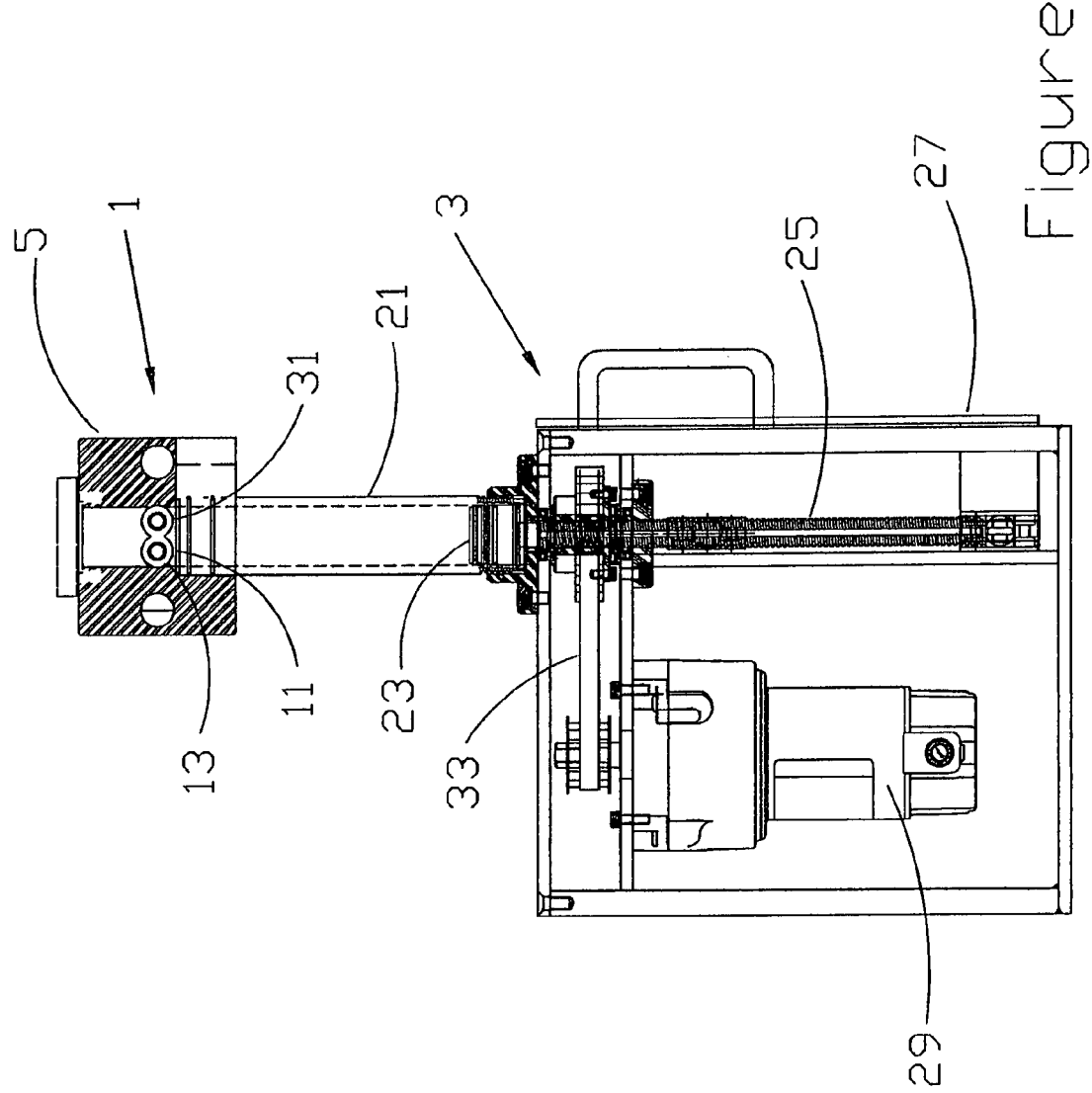
FIG. 2 is a front view of the embodiment of the present invention materials extrusion device including a twin screw extruder with a plunger feeder shown in FIG. 1.
Figure 3:
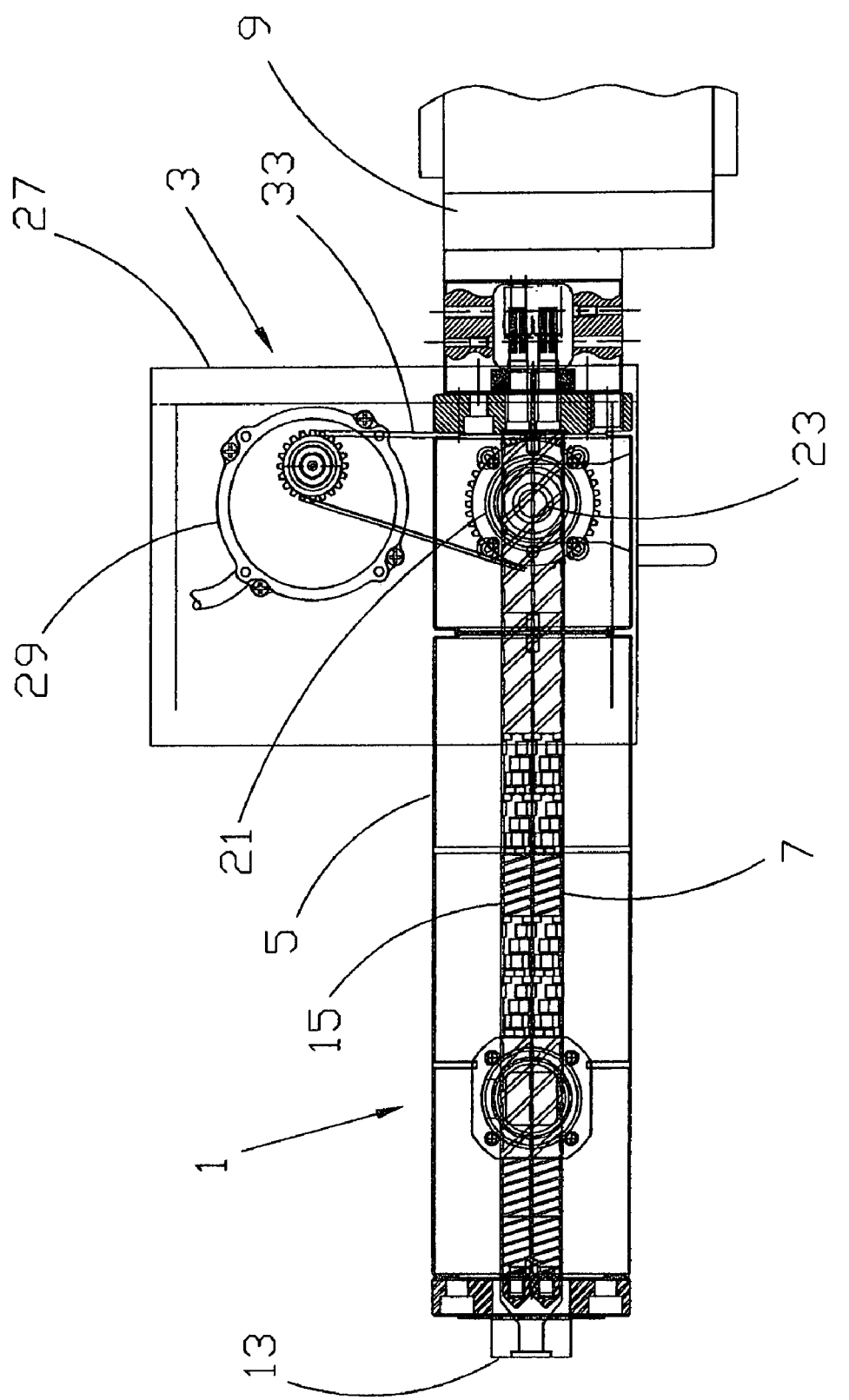
FIG. 3 is a top view of the embodiment of the present invention materials extrusion device including a twin screw extruder with a plunger feeder shown in FIGS. 1 and 2.

FIG. 1 is a side view of an embodiment of a present invention materials extrusion device including a twin screw extruder 1 with a plunger feeder 3. FIG. 2 is a front view of the embodiment of the present invention materials extrusion device shown in FIG. 1 and FIG. 3 is a top view of the embodiment of the present invention materials extrusion device shown in FIGS. 1 and 2. These three Figures are now discussed collectively and not all reference numerals appear in all Figures.

In these three FIGS. 1 through 3, screw extruder 1 has a main housing 5 with materials advancing twin screws 7 and 15 rotateably mounted therein. There is a twin screw drive mechanism 9 that is conventional with conventional operational controls and may include heating means and heating controls. Feed port 11 is located on the underside of main housing 5 and adapted to receive plunger feeder 3 in a sealed arrangement for inputting materials to be extruded and extruding those materials with or without heat, via extrusion outlet port 13. This outlet port may be an open exit port, a die and/or connection to subsequent process units, such as pelletizers, grinders, cutters, quality control monitors, sorters, counters, and packaging and labeling equipment.

Plunger feeder 3 has an elongated, upwardly biased plunger housing 21 and a plunger 23 positioned in the plunger housing 21. A plunger drive mechanism is connected to the plunger 23 to move the plunger 23 upwardly and downwardly within the plunger housing 21. A feed outlet 31 is located at the upper end of the plunger housing 21 and is connected to twin screw extruder feed port 11, as shown. The plunger drive mechanism is an AC or DC gear motor 29 with a timing belt 33 in cabinet 27. There is also a control means 35 connected to the motor 29 to turn it off and on and to vary its rotational speed. The plunger feeder 3 is slideably removable relative to the screw extruder 1 so that each may be cleaned and serviced separately and so that the plunger feeder 3 may be loaded with materials via gravity feed.

To operate this present invention device, a user may position the plunger 23 downwardly in the plunger housing, i.e., to its lowest position, and then gravity fill the plunger housing 21 with materials to be extruded, such as plastics, pharma products, food products or chemical products that are flowable (powders, granules, crushables, slurries, etc.). Next, the user starts the screw extruder 1 with the screw drive mechanism 9 and then operates the plunger drive mechanism to advance the plunger 23 upwardly for moving the materials at a controlled rate out of the plunger housing 21 and into the screw extruder 1 for extrusion of the materials therefrom via extrusion outlet port 13.

Figure 4:
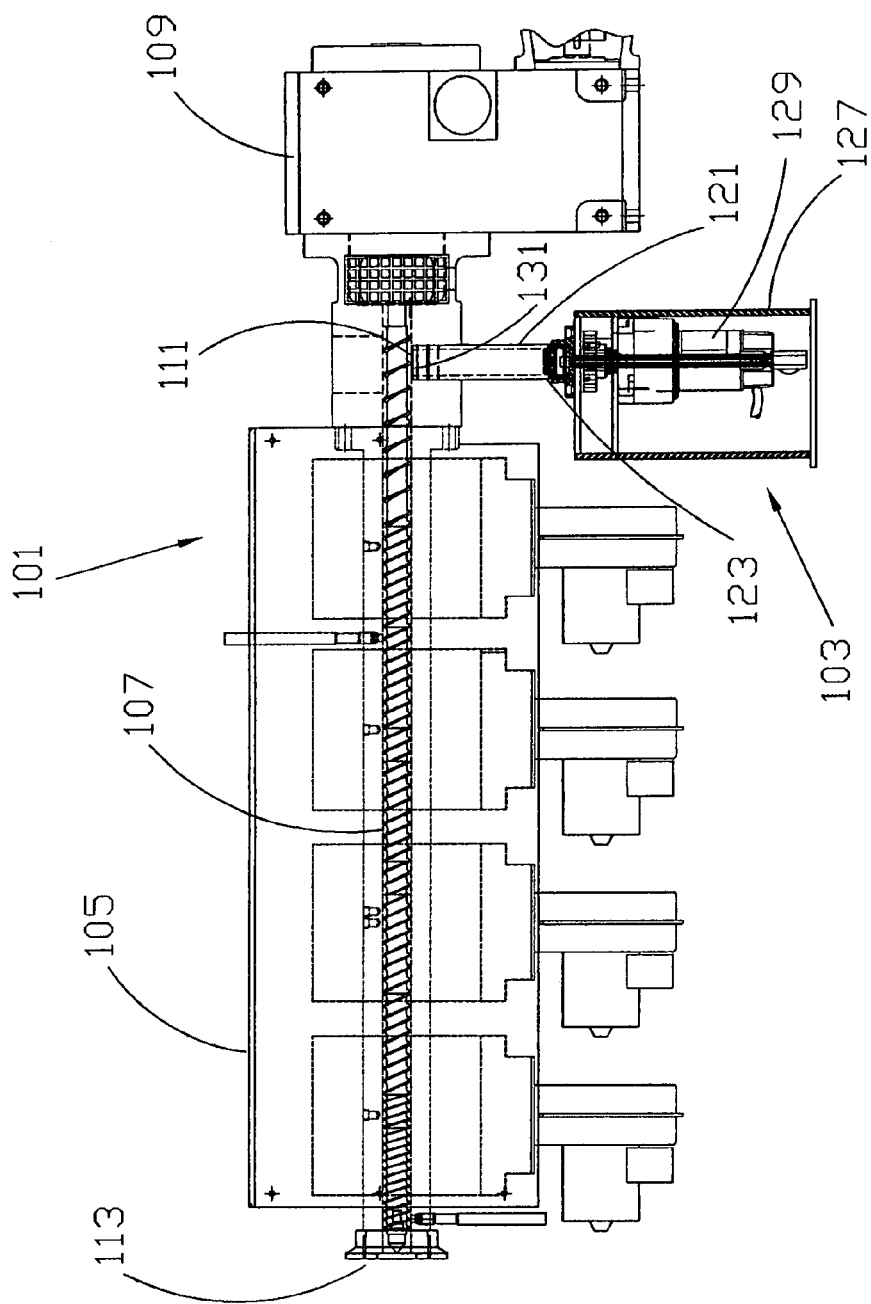
FIG. 4 is a side view of an embodiment of a present invention materials extrusion device including a single screw extruder with a plunger feeder; and, FIG. 5 is a top view of the embodiment of the present invention materials extrusion device including a single screw extruder with a plunger feeder shown in FIG. 4.
Figure 5:
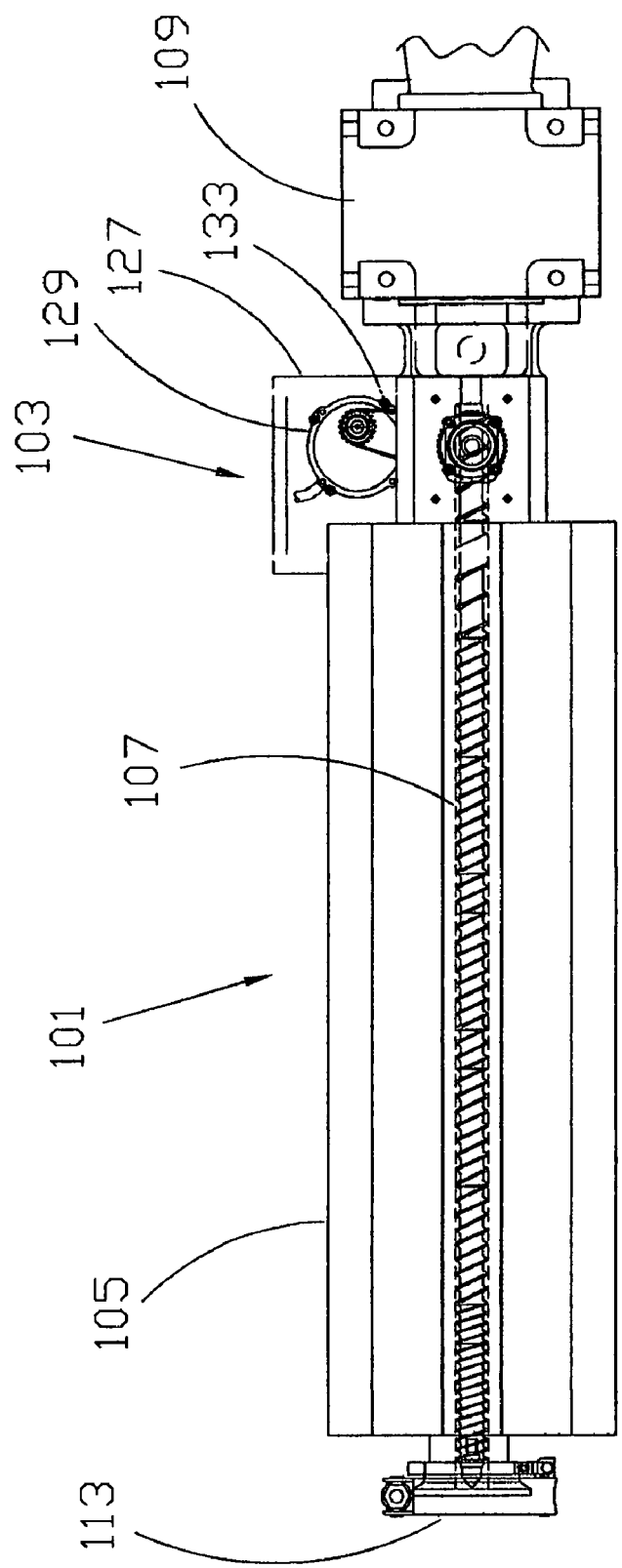

FIG. 4 is a side view of an embodiment of a present invention materials extrusion device including a single screw extruder 101 with a plunger feeder 103. FIG. 5 is a top view of the embodiment of the present invention materials extrusion device shown in FIG. 4. These two Figures are now discussed collectively; not all reference numerals appear in both Figures.

In FIGS. 4 and 5, screw extruder 101 has a main housing 105 with materials advancing single screws 107 rotateably mounted therein. There is a screw drive mechanism 109 at the downstream end that is conventional with conventional operational controls and it includes heating means and heating controls. Feed port 111 is located on the underside of main housing 105 to connect to plunger feeder 103 for inputting materials to be extruded and extruding those materials with or without heat or melt, via extrusion outlet port 113.

Plunger feeder 103 has an elongated, upwardly biased plunger housing 121 and a plunger 123 positioned in the plunger housing 121. A plunger drive mechanism in cabinet 127 is connected to the plunger 123 to move the plunger 123 upwardly and downwardly within the plunger housing 121, similarly to that disclosed in conjunction with the previous Figures. A feed outlet 131 is located at the upper end of the plunger housing 121 and is connected to twin screw extruder feed port 111, as shown. The plunger drive mechanism is an AC or DC gear motor 129 with a timing belt 133. There is also a control means 135 connected to the motor 129 to turn it off and on and to vary its rotational speed.

The present invention device is operated in the same manner as the previously discussed present invention device, except that it is a single screw extruder and is used for less rigid mixing and density requirements. The following are examples of present invention devices:

EXAMPLES 1 AND 2

Twin Screw Small Scale Batch and Single Screw Small Scale Batch

A present invention device is constructed in accordance with FIGS. 4 and 5. It includes a Micro Plunger Feeder device designed to meter precise quantities of material per unit of time into the extruder, on a batch basis. In terms of feed rates it is capable of extremely low rates (down to 0.4 grams/ minute), which are not attainable with conventional dropfeeders. The same operating principle could be applied on much larger applications for introducing non-free flowing materials to the extruder in a positive manner. The plunger feeder can be interfaced to either the single screw extruder (FIGS. 3 and 4) or the twin screw extruder (FIGS. 1, 2, 3).

General specifications for a preferred embodiment of each version, single or twin:
tube capacity: 100 cc
minimum rate setpoint: 0.4 g/minute
maximum rate setpoint: 9.53 g/minute
drive power: DC gearmotor
1/45 HP with variable-speed control
gearmotor max. RPM: 4.5
max. plunger force upwards: 7,000 newtons
total plunger travel: 150 mm
tube I.D.: 30 mm
contact materials of contruction: 300-series stainless steel and Delrin (polyethylene inert plastic) Mechanics: The Feeder is a small ram plunger, utilizing a Delrin piston closely fitting within a vertical cylindrical tube. Although the cylinder tube (main plunger feeder housing) is cylindrical, it could have any cross-sectional shape without exceeding the scope of the present invention, and square and rectangular configurations are also preferred. The material to be fed is loaded within the tube, above the Delrin piston, when the piston is at the lowest position of its travel. The piston is pushed upwards by a trapezoidal power screw, driven by a DC gearmotor via a timing belt. The timing belt provides a 2:1 secondary speed reduction. The thrust load from ramming the material into the extruder is taken up by a thrust bearing in the power screw mechanism. The speed of the DC gearmotor may be varied by use of a DC motor controller. The amount of material filled (to be extruded) may be judged by a linear scale on the front of the unit, with markings, for example, in cubic centimeters. The entire plunger feeder chassis is mounted on a horizontal linear slide base, so it may be conveniently retracted from under the extruder barrel (main housing) for refilling the tube with material, or cleaning. The entire feeder chassis is made of aluminum for lightweight movement and shipping, and so that it may be easily lifted onto a workbench if more extensive maintenance is needed. The plunger feeder is operated on a batch-cycle basis, meaning the cylindrical tube functions as a reservoir of material, and when this material is used up by the extrusion process must be stopped while the tube is refilled. The tube capacity is 100 cc, and it is expected that an extrusion batch at a typical feed rate will take approximately 15 to 20 minutes, although it could be longer at a very slow feed rate.

Normal operation is in accordance with steps as follows:
1) Retract feeder from under extruder, using linear slide base.
2) Fill plunger tube with material, using a common funnel (note: material may be left in the tube "loose", or may be compacted with a Delrin tool provided for this purpose).
3) Slide feeder into the Run position under the extruder barrel.
4) Start the extruder screws rotating at a set speed.
5) Start the plunger feeder DC controller, at a set feed rate in grams/minute.
6) Run the extrusion process until the linear scale on the feeder shows the material has been all used up, or until the feeder DC drive shuts off from contacting the upper limit switch.
7) Shut the extruder drive off.
8) Retract the plunger position down to its lowest position.
9) At this point the piston and tube may be removed for cleaning, or if more samples of the same material are desired the tube may be simply refilled and the process started again.

The speed of the DC gearmotor is variable and allows control over the feed rate. Within the DC drive there is a current limit setting, which may be adjusted to prevent the piston from applying too much force, in the event that the extruder screw(s) cannot take the material away from the feed port fast enough. There is a retract function built into the control system, so that after the piston has reached the upper limit or its travel it may be retracted back to the lowest position at max. speed. There is an upper limit switch and lower limit switch, to prevent over-travel of the trapezoidal power screw. If the limit switch is contacted the DC controller will automatically stop the gearmotor. The DC drive is interlocked with the extruder screw drive, so that the plunger feeder can only meter material into the extruder when the screw(s) are rotating (to prevent jam-ups of excess material). If the system is running and the extruder screw drive should stop for any reason, the plunger feeder will also stop automatically. There is also a bypass switch and bypass so that the feeder may be calibrated offline without the extruder screws rotating. AC variable speed motors/drives would be used on larger units. Among the components that could be changed without affecting the functionality of the present invention devices: different I.D. tubes and pistons, different cc capacity of the tube, different lengths of piston travel, different gearmotor reduction ratios, different gearmotor HP, AC or DC gearmotors would work the same, different timing belt ratios, different actuation mechanisms besides a trapezoidal power screw would work the same, different mounting positions besides vertically underneath the extruder barrel would work the same, the plunger feeder could perform the same function if used with a multi-screw extruder, such as a twin-screw extruder, single-screw extruder, or various types or molding machines requiring a feeding device and type of continuous mixer/processing device to which it is interfaced. The invention will be utilized to process small batch samples of a wide variety of products for the plastics and pharmaceutical industries, including but not limited to mixing excipients with active pharmaceutical ingredients. The device could also be used for food type products. After introduction into the extruder, various unit operations will be performed, including feeding, melting, mixing, venting of volatiles, and pumping/discharge through a die. The product may be formed into a shape by the die. After discharge from the die the extrudate typically cooled in air, water, and or rolls or a conveyer. The extrudate is then cut, wound or size reduced, based upon the intended purpose. In some instances, the process will not be a hot melt extrusion, but a cold extrusion process, in which case melting will not occur.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:
1. A materials extrusion device including a screw extruder with a plunger feeder, which comprises:
  a) a screw extruder having a main housing, a materials advancing screw, a screw drive mechanism, a feed port for inputting materials to be extruded and an extrusion outlet port; and, b) a plunger feeder having an elongated, upwardly biased plunger housing, a plunger positioned in said plunger housing, a plunger drive mechanism connected to said plunger to move said plunger upwardly and downwardly within said plunger housing, and a feed outlet at an upper end of said plunger housing, said feed outlet being connected to said screw extruder feed port;

wherein a user may position said plunger downwardly in said plunger housing, gravity fill said housing with materials to be extruded, operate said screw extruder with said screw drive mechanism and operate said plunger drive mechanism to advance said plunger upwardly for moving said materials at a controlled rate out of said plunger housing and into said screw extruder for extrusion of said materials therefrom.

2. The materials extrusion device including a screw extruder with a plunger feeder of claim 1 wherein said plunger drive mechanism includes a power screw and a gear motor with a timing belt and variable rate control means.

3. The materials extrusion device including a screw extruder with a plunger feeder of claim 1 wherein said screw extruder further includes at least one heating element and heating element control means.

4. The materials extrusion device including a screw extruder with a plunger feeder of claim 1 wherein said screw extruder is a horizontal screw extruder and said plunger feeder is a non-horizontal plunger feeder.

5. The materials extrusion device including a screw extruder with a plunger feeder of claim 1 wherein said screw extruder is a horizontal screw extruder and said plunger feeder is a vertical plunger feeder.

6. The materials extrusion device including a screw extruder with a plunger feeder of claim 1 wherein said plunger drive mechanism includes a power screw, a DC gear motor with a timing belt and a DC motor controller.

7. The materials extrusion device including a screw extruder with a plunger feeder of claim 1 wherein said plunger drive mechanism includes a power screw and an AC gear motor with a timing belt and an AC motor controller.

8. The materials extrusion device including a screw extruder with a plunger feeder of claim 1 wherein said device includes a plunger feeder bypass to enable operation of said plunger feeder while bypassing said screw extruder to test or calibrate said plunger feeder.

9. The materials extrusion device including a screw extruder with a plunger feeder of claim 1 wherein said plunger feeder is a micro plunger feeder and said plunger feeder includes stops that limit travel of said plunger to less than ten inches.

10. The materials extrusion device including a screw extruder with a plunger feeder of claim 1 wherein said device contains components that contact materials to be extruded that are made of an acceptable non-reactive material selected from the group consisting of stainless steel, nickel-based alloy, inert plastic and combinations thereof.

11. A materials extrusion device including a screw extruder with a plunger feeder, which comprises:

a) a multi-screw extruder having a main housing, materials advancing multi-screws, a multi-screw drive mechanism, a feed port for inputting materials to be extruded and an extrusion outlet port; and, b) a plunger feeder having an elongated, upwardly biased plunger housing, a plunger positioned in said plunger housing, a plunger drive mechanism connected to said plunger to move said plunger upwardly and downwardly within said plunger housing, and a feed outlet at an upper end of said plunger housing, said feed outlet being connected to said multi-screw extruder feed port;

wherein a user may position said plunger downwardly in said plunger housing, gravity fill said housing with materials to be extruded, operate said multi-screw extruder with said screw drive mechanism and operate said plunger drive mechanism to advance said plunger upwardly for moving said materials at a controlled rate out of said plunger housing and into said multi-screw extruder for extrusion of said materials therefrom.

12. The materials extrusion device including a screw extruder with a plunger feeder of claim 11 wherein said plunger drive mechanism includes a power screw and a gear motor with a timing belt and variable rate control means.

13. The materials extrusion device including a screw extruder with a plunger feeder of claim 11 wherein said multi-screw extruder further includes at least one heating element and heating element control means.

14. The materials extrusion device including a screw extruder with a plunger feeder of claim 11 wherein said multi-screw extruder is a horizontal multi-screw extruder and said plunger feeder is a non-horizontal plunger feeder.

15. The materials extrusion device including a screw extruder with a plunger feeder of claim 11 wherein said multi-screw extruder is a horizontal multi-screw extruder and said plunger feeder is a vertical plunger feeder.

16. The materials extrusion device including a screw extruder with a plunger feeder of claim 11 wherein said plunger drive mechanism includes a power screw, a DC gear motor with a timing belt and a DC motor controller.

17. The materials extrusion device including a screw extruder with a plunger feeder of claim 11 wherein said plunger drive mechanism includes a power screw and an AC gear motor with a timing belt and an AC motor controller.

18. The materials extrusion device including a screw extruder with a plunger feeder of claim 11 wherein said device includes a plunger feeder bypass to enable operation of said plunger feeder while bypassing said multi-screw extruder to test or calibrate said plunger feeder.

19. The materials extrusion device including a screw extruder with a plunger feeder of claim 11 wherein said plunger feeder is a micro plunger feeder and said plunger feeder includes stops that limit travel of said plunger to less than ten inches.

20. The materials extrusion device including a screw extruder with a plunger feeder of claim 11 wherein said device contains components that contact materials to be extruded that are made of an acceptable non-reactive material selected from the group consisting of stainless steel, nickel-based alloy, inert plastic and combinations thereof.

* * * * *